June 10, 1930. W. K. GOSNER 1,763,147
AIRCRAFT CONSTRUCTION
Filed June 6, 1929 2 Sheets-Sheet 1

Inventor
William K Gosner

By Clarence A. O'Brien
Attorney

June 10, 1930.    W. K. GOSNER    1,763,147
AIRCRAFT CONSTRUCTION
Filed June 6, 1929    2 Sheets-Sheet 2
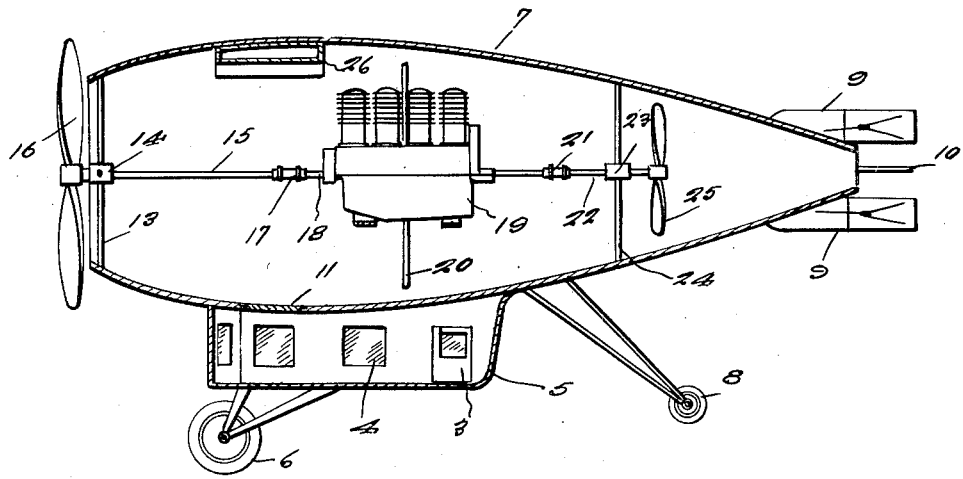
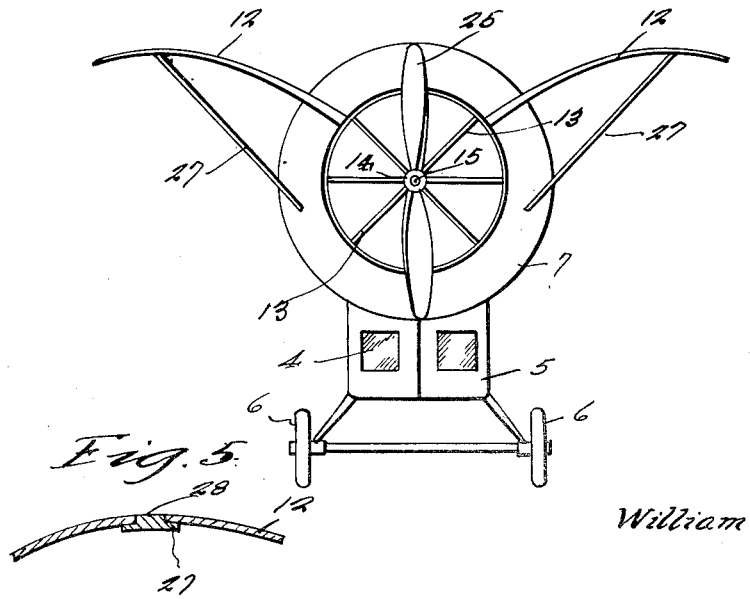
Inventor
William K Gosner
By Clarence A. O'Brien
Attorney Patented June 10, 1930

1,763,147

UNITED STATES PATENT OFFICE

WILLIAM K. GOSNER, OF ATLANTIC CITY, NEW JERSEY

AIRCRAFT CONSTRUCTION

Application filed June 6, 1929. Serial No. 368,840.

This invention relates to air ships and similar aircraft and has as its primary object the provision of an improved propelling mechanism for aircraft which will greatly increase the efficiency of the motor employed for driving the propellers and thereby increase the possible speed of the aircraft.

A further object of this invention is to provide a propelling mechanism for aircraft that is provided with lifting and traction propellers which create a forced draft through a tube forming a part of the construction and which propels the craft.

To the attainment of the above broadly stated objects and others which will appear as the description proceeds, the invention consists as may be broadly stated, in the provision of a tube of substantially conoidal configuration open at its opposite end, and extending longitudinally of the craft and with the tube there is associated a plurality of motor driven propellers so arranged as to provide compressions within the tube to greatly facilitate the raising of the machine, together with the increasing of the tractile speed of the craft.

Another very important object of the invention is to provide an air craft consisting of certain structural features as above broadly stated, which will be simple in construction, comparatively inexpensive to operate and maintain, practical and thoroughly reliable in operation.

The invention may be more readily understood as the description proceeds by reference to the accompanying drawings, in which:

Figure 3 is a longitudinal section taken through the air craft.

Figure 4 is a front elevation thereof.

Figure 5 is a detail sectional view, clearly illustrating the joint between the wing and brace members therefor.

Figure 1:
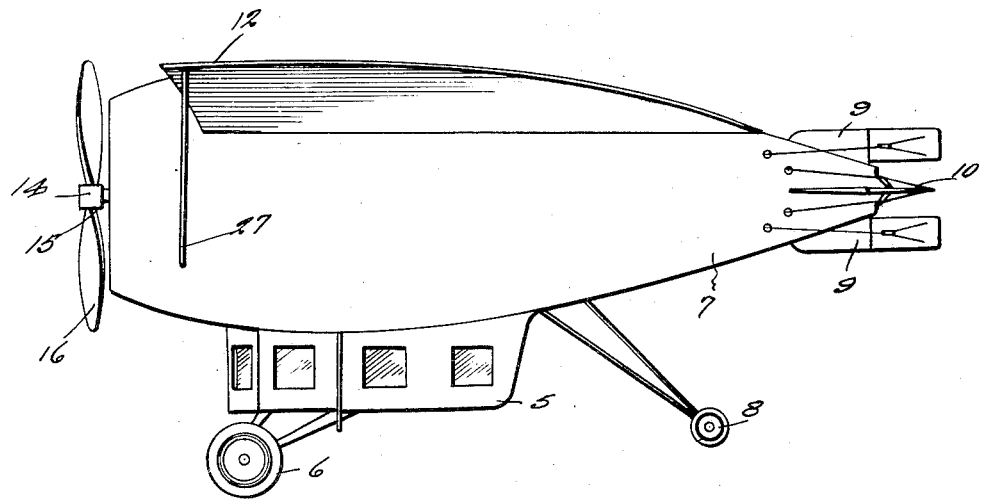
Figure 1 is a side elevation of an aircraft constructed in accordance with the present invention.
Figure 2:
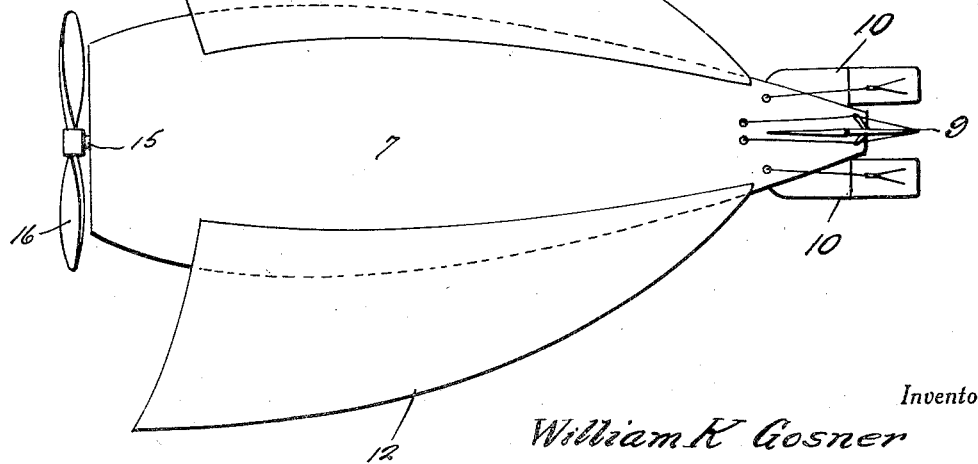
Figure 2 is a top plan view thereof.

With reference more in detail to the drawings, it will be seen that the reference numeral 5 designates the hollow body of an aeroplane which is preferably of metallic construction, light metal such as aluminum being utilized, and of any suitable shape, preferably converging toward its front, in a somewhat pointed nose, as shown to advantage in Figure 4. Suitably supported on the housing 5 are the forward wheels 6. A longitudinally extending tube 7 is supported on the body 5, said tube as illustrated in Figure 3, forming the top wall of the body 5 and said tube further extending beyond the forward and rearward ends of the body 5. As herein illustrated, the tube 7 is preferably of conoidal configuration, tapering from its forward and rearward end and being open at said ends. Depending downwardly and extending rearwardly of said tube adjacent the rear end of the housing 5 is a suitable guide wheel 8. It is to be noted that the guide wheel 8 is of a diameter less than the diameters of the forward wheels 6, said wheel 8 being adapted to be swivelly supported, thus acting as a guide wheel and permitting quick turning of the craft. At its tapered rear extremity and what may be referred to as its apex the tube 7 is suitably provided with the rear elevators 9—9 and rudder 10, all being controlled by the operator located within the body 5 of the shaft. As is obvious the body 5 forms a car of the craft, said body being provided with a suitable window 4 and door 3, to comfortably house the operator and passengers of the craft. The tube 7 is also provided with an aperture 11, affording intercommunication between the tube and the body 5. The wings of the aircraft are preferably formed of a single piece of material of substantially semi-ovate configuration, the center longitudinal portion of the material extending longitudinally of the exterior of the tube 7 and across the upper portion of the tube. The end portions of the material extending laterally from opposite sides of the tube, said end portions having their outer edges curving rearwardly as they return into the tube. The outer portions of the material forming the wings 12—12 are substantially concaved throughout their length thus providing curved longitudinally extending wings. Adjacent its relatively larger forward opening there is located within the tube, a spider like structure 13, said spider having a centrally disposed bearing 14, within which one end of a shaft 15 is rotatably suported. The said one end of the shaft 15 projecting beyond the adjacent end of the tube 7 and has secured thereto a suitable propeller 16. At its opposite end, the shaft 15 has a connection 17 with the drive shaft 18 of a suitable motor 19, preferably in the nature of an internal combustion engine. As illustrated, the motor 19 is located centrally of the tube 7 and is suitably supported therein by means of the supporting members 20. The drive shaft 18 of the motor 19 also has one end thereof extending rearwardly of the motor, said rearwardly extending end being coupled as at 21, to a propeller shaft 22, journaled in a bearing 23, formed in a spider-like structure 24, located interiorly of the tube 7, adjacent the tapered extremity of the tube and spaced inwardly from the rear opening in the tube.

The spider-like supporting structure 24 is similar to the spider 13, and the shaft 22 has at its free end a relatively smaller propeller 25, located in the rear end portion of the tube 7.

As illustrated in Figure 3, a suitable gasoline reservoir tank 26 may be supported within the tube 7, adjacent the forward end of the tube. This tank 26 of course, has suitable feed line connections with the motor 19 (such connection not being shown).

It is yet to be mentioned that adjacent their forward or what may be termed leading edges, the respective wings 12 are suitably supported by means of reinforcing braces 27 extending upwardly and outwardly from adjacent sides of the tube 7, said braces 27 at their upper ends having a mortised joint connection 28, with the respective wings.

As shown in Figure 3, the forward propeller 16 is of greater size than the rearwardly disposed propeller 25 and both of these propellers are in substantially longitudinal alignment. The forwardly or exteriorly located propeller 16 forms the first source of lifting power for the craft.

While the second or interiorly disposed propeller 25 will draw the air through the tube, providing an auxiliary lifting tower. The air rushing through the tube forms an energy exerting a forward pull upon the front of the aircraft, and as it were a pushing effect upon the rear. The desired result is attained by having the propellers revolve on the same shaft at the same speed, the front propeller being larger than the rear propeller, with a small portion of energy being outside of the tube. It is to be understood that the tube 7 is of course made from light metal, such as sheet aluminum.

From the foregoing then, it will be seen that in an aircraft constructed in this manner there is provided greater lifting power, an increase in the speed of the aircraft, since as is obvious the cylinder 7 forms a compression chamber as soon as the motor is in operation. A further advantage of an aeroplane constructed in this manner is that should the motor stop in mid air, the plane may be safely brought to earth, the tube and the particular wing structure acting as a parachute thus permitting a slow descent of the craft. An aeroplane structure of this nature will also prevent nose dives, tail spins and otherwise render the machine safe either during the operation of the motor or in the event that the motor should develop trouble within its mechanism, the craft as before mentioned, due to its particular tubular construction and wing surface slowly descending in a manner similar to a parachute.

Even though I have shown and described in detail, the preferred embodiment of my invention, it is to be understood that the same is susceptible of changes fully comprehended by the spirit of the invention and the scope of the appended claims.

What is claimed is:

1. In an aeroplane construction of the character described, a metallic body, a longitudinally extending substantially frusto-conical shaped tube supported on the hollow body and extending forwardly and rearwardly beyond said body, said tube being provided at its forward end with a relatively large opening, and at its rear end with a relatively small opening, said tube being further provided with an aperture affording communication between said body and said tube, longitudinally extending curved wings projecting laterally from opposite sides of the tube, a motor located within said tube, a relatively large propeller operatively associated with said motor disposed exteriorly of the tube adjacent the relatively large opening formed in said tube, and a relatively small propeller located within the tube adjacent the rear end of the tube and disposed in spaced relation with the relatively small opening in the tube, said propeller being operatively associated with said motor, all in the manner and for the purpose set forth.

2. An aeroplane comprising a body, a longitudinally tapering tube supported on said body and extending beyond the adjacent ends of said body, said tube being open at said end, a relatively large propeller mounted exteriorly of said tube at its largest end, a relatively small propeller mounted within said tube inwardly from the smallest end of said tube, said propellers having their axes in longitudinal alignment, a motor arranged in said tube between said propellers, means operatively connecting the propellers with said motor, wings projecting laterally from opposite sides of said tube, said wings tapering longitudinally toward the smallest end of said tube, said wings being substantially arcuate in cross section.

In testimony whereof I affix my signature.

WILLIAM K. GOSNER.